Jan. 18, 1955   W. BOSTOCK   2,699,673
APPARATUS FOR DETERMINING PARTICLE SIZE DISTRIBUTION
Filed Nov. 17, 1952   2 Sheets-Sheet 1

Inventor
W. Bostock

Jan. 18, 1955 W. BOSTOCK 2,699,673
APPARATUS FOR DETERMINING PARTICLE SIZE DISTRIBUTION
Filed Nov. 17, 1952 2 Sheets-Sheet 2

Inventor
W. Bostock

2,699,673

APPARATUS FOR DETERMINING PARTICLE SIZE DISTRIBUTION

William Bostock, Stockport, England, assignor to Simon-Carves Limited, Stockport, England, a British company Application November 17, 1952, Serial No. 320,996

Claims priority, application Great Britain December 5, 1951

4 Claims. (Cl. 73—61)

The invention has for its object to provide a convenient apparatus for use in determining the distribution of particle size in a finely divided material.

The apparatus according to the invention comprises a settling tube adapted to contain a suspension of the finely divided material in a liquid in which the material is insoluble, its lower end being open and adapted to be immersed in a bulk of the same liquid, a receiver for settled particles under the lower end of the tube and means for weighing the total quantity of material which has settled on the receiver.

In a convenient arrangement in accordance with the invention, the settling tube is supported vertically with its lower end below the level of a liquid in a tank, and is enclosed in a constant temperature jacket. The top end of the tube is arranged to be coupled with a pre-mixing tube having a bulb in which a suspension of a finely divided material in a liquid can be placed and shaken to ensure uniform distribution, and tubes from the top and bottom of the bulb which can be connected to the top of the settling tube to make an air-tight joint therewith, so that the suspension can be run out of the bulb into the settling tube, air displaced from the settling tube flowing to the top of the bulb. As the top of the settling tube is shut off from the atmosphere, a column of suspension in it is supported by the pressure of the air above the liquid in the tank. The pre-mixing tube may be marked to ensure that the same volume of liquid is used for each test and may be connected to the settling tube by flexible rubber connections which may be closed by clips when the suspension has been run into the settling tube. The latter has a mark near the bottom for the liquid level in the tank, and a mark near the top for the height of the suspension.

Beneath the settling tube, immersed in the clear liquid in the tank, is a balance pan carried by an arm connected to a torsion wire and to a detecting arm which may be placed horizontally or vertically, carrying a graticule which is illuminated by a light source and observed by a telescope. Zero adjustments are made by twisting the torsion wire by any suitable mechanism. The balance pan is supported against the initial shock on introducing the suspension either by clamping the torsion wire against a suitable stop or by an arrangement beneath the pan which may be operated by a screw or cam or other suitable mechanism.

If it is desired to avoid balance pan movement, an arrangement may be used in which the weight deposited is indicated by the amount of twist applied to the torsion wire to keep the balance pan stationary.

Referring to the accompanying drawings.

Figure 1:
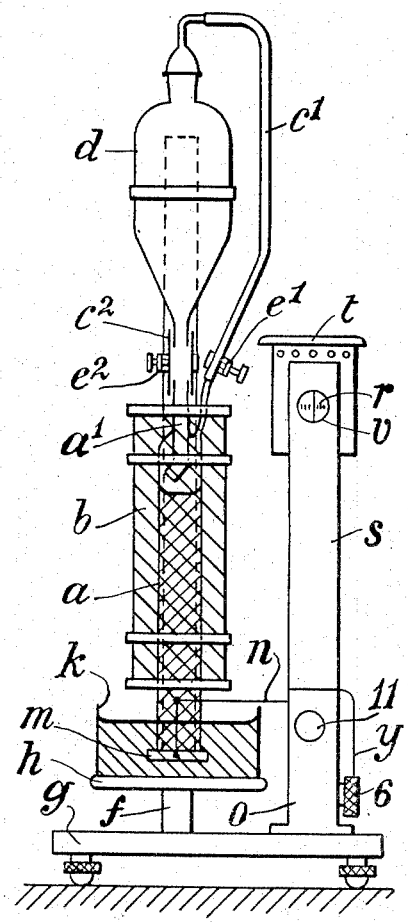
Figure 1 is a front elevation of one form of the apparatus according to the invention.
Figure 2:
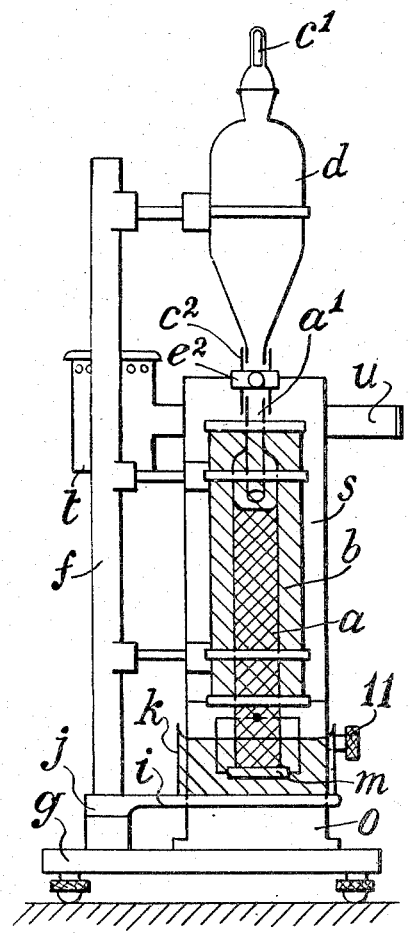
Figure 2 is a side elevation.
Figure 3:
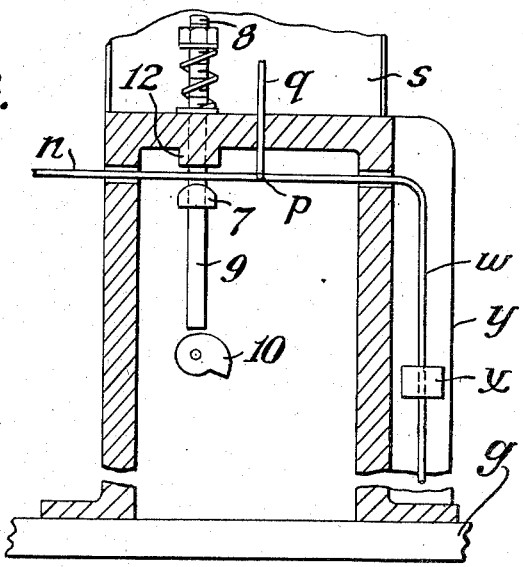
Figures 3 and 4 are sectional views showing the weighing means.
Figure 4:
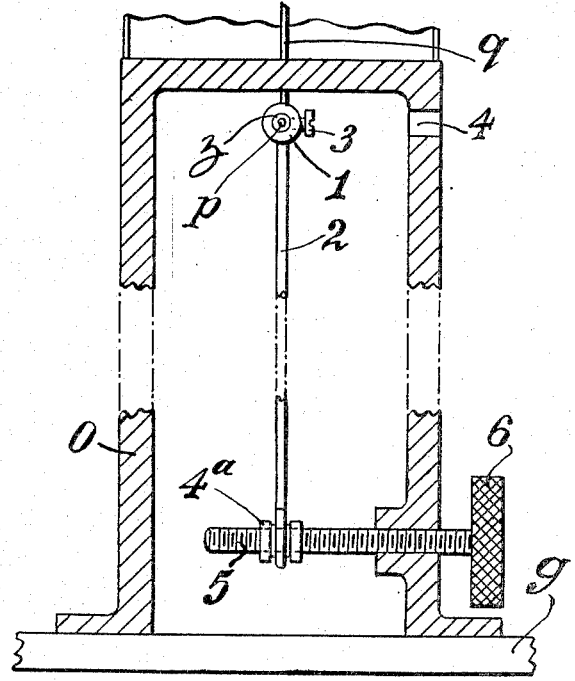

A settling tube $a$ is located inside a constant temperature jacket $b$, and the top and bottom respectively of a premixing tube $d$ are connected to the top of the tube $a$ by flexible tubes $c^1$ and $c^2$ which can be closed by spring or screw clips $e^1$ and $e^2$, so that liquid is prevented from flowing from the tube $d$ to the tube $a$ while the clips are closed, and the tube $d$ can be shaken while in position. The whole arrangement is rigidly connected to a hollow cylinder $f$ which can move freely around a central rod fixed to a cast iron base $g$. When not in use the whole combination can be lifted and swung sideways to give access to the rest of the apparatus.

Beneath the settling tube $a$ is a flat platform $h$ carrying a clear liquid tank $k$. This platform $h$ is arranged to move sideways to permit the removal of the clear liquid tank $k$ for cleaning or any other purpose, being supported by an arm $i$ projecting from a collar $j$ surrounding the central rod beneath the cylinder $f$. Also beneath the settling tube $a$ and inside the clear liquid tank $k$ is the balance pan $m$, attached to the connecting arm $n$.

The connecting arm $n$ passes through an opening into a casting $o$ in which is mounted a torsion wire $p$ to which the arm $n$ is secured. A detecting arm $q$ is secured at one end to the torsion wire $p$, its other end carrying a graticule $r$. The arm $q$ is enclosed in a container supported by the casting $o$ and carrying at its upper end a housing $t$ for a lamp illuminating the graticule, and a mounting $u$ for a lens system and a ground glass screen $v$ on to which an image of the graticule is projected so that its movement can be followed against a hair line on the screen $v$. The sensitivity may be such that ½ gram of material deposited on the pan will cause full scale deflection of the graticule.

There is attached to the torsion wire $p$ an arm $w$ which passes through a hole in the side of the casting $o$ and is bent downwards and carries a sensitivity bob $x$ which can be slid up and down for maintaining the deflection of the arm $q$ constant for a given weight on the balance pan irrespective of the density of the material on the pan. The bob $x$ has a spring to hold it in the position to which it is set, and the arm $w$ carrying the bob is enclosed by a removable cover $y$.

One end of the torsion wire $p$ is fixed, and the other end has a nipple $z$ which can turn in a collar 1 on an arm 2 and can be locked therein by means of a grub screw 3 which can be turned by inserting a screw driver through a hole 4 in the casting $o$. The other end of the arm 2 engages a collar $4a$ threaded on to a screw 5 having a knob 6 outside the casting $o$. The grub screw 3 is tightened with the arm 2 in a convenient position relative to the screw 5, and then the zero position of the graticule $r$ can be finely adjusted by turning the knob 6. If the knob 6 is provided with a scale and vernier, it may be used for keeping the graticule at the zero setting and the balance pan stationary and determining the weight deposited by the amount of twist applied to the torsion wire.

There is a bar 7 under the connecting arm $n$, supported by two spring loaded rods 8 passing through the top of the casting. Under the bar 7 is a plunger 9 actuated by a cam 10 turned by a knob 11, to raise the bar 7 and clamp the arm $n$ against a projection 12 on the casting, for holding the balance pan firmly against the bottom of the settling tube $a$ prior to beginning a series of observations or for preventing damage to the torsion wire during transit.

One manner in which the apparatus may be used is as follows. The density of the material to be examined is determined by any standard method and the sensitivity bob $x$ adjusted accordingly. The liquid in which it is proposed to examine the powder, (water to which a dispersing agent has been added is a suitable liquid) is introduced into the clear liquid tank and adjusted to the correct level. Zero adjustments, if necessary, are made at this stage and the balance pan $m$ clamped against the lower end of the settling tube $a$. Approximately ½ gram of powdered material is taken and thoroughly dispersed in a known volume of the same liquid as introduced into the clear liquid tank, to form a homogeneous suspension. As a precaution the suspension may be examined microscopically to ensure that complete dispersion has been obtained. The homogeneous suspension is introduced into the pre-mixing tube $d$ and the system closed. The suspension is rapidly transferred to the settling tube $a$ by opening the clips $e^1$ and $e^2$ on the flexible connections $c^1$ and $c^2$ and there forms a column of liquid of known height. The balance pan $m$ is quickly unclamped and the particles are allowed to settle under gravity on to the balance pan. The changes in weight are followed by movement of the image of the graticule $r$ on the ground glass screen $v$.

Readings of the weight deposited are taken at intervals of time, preferably in multiples of two to give an even plot on a logarithmic basis. The weights, expressed as percentages of the final reading, are plotted against the logarithm of the time. A second curve is obtained representing the differential of the cumulative weight with respect to the logarithm of the time. It can be shown that the difference between the ordinates of the two curves gives the percentage weight greater than a certain size defined by the time corresponding to the ordinates and the weight-size distribution relationship can therefore readily be evaluated. Mathematical treatments are available for calculating the results directly from the readings if it is desired to avoid curve drawing.

What we claim is:

1. An apparatus for determining the distribution of particle size in a finely divided solid comprising a settling tube adapted to contain a suspension of the finely divided material in a liquid in which the material is insoluble, its lower end being open, an open tank in which the open lower end of the settling tube is adapted to be immersed in a bulk of the same liquid, means for temporarily closing the lower end of the settling tube while it is being filled with suspension a receiver for settled particles under the lower end of the tube and means for weighing the total quantity of material which has settled on the receiver.

2. An apparatus as claimed in claim 1, having a pre-mixing tube in which a suspension can be placed and shaken to ensure uniform distribution, and means for transferring the suspension from the pre-mixing tube to the settling tube.

3. An apparatus as claimed in claim 2, in which the premixing tube is arranged to be coupled at its lower end with the top of the settling tube so as to make an air tight joint, and there is a connection from the top of the pre-mixing tube to the top of the settling tube, with means for obstructing said connection until it is desired to transfer liquid from the premixing tube to the settling tube.

4. An apparatus as claimed in claim 1, and having means for moving the receiver into contact with the lower end of the settling tube to temporarily close same.

References Cited in the file of this patent

UNITED STATES PATENTS 2,597,899    Payne _____ May 27, 1952

FOREIGN PATENTS 348,459    Great Britain _____ May 14, 1931

OTHER REFERENCES

Bureau of Standards Research Journal, vol. 12, Feb. 1934; pp. 173–183, Dana L. Bishop.